US009449286B2

(12) United States Patent
Sega et al.

(10) Patent No.: US 9,449,286 B2
(45) Date of Patent: Sep. 20, 2016

(54) MACHINE LEARNING APPARATUS AND METHOD WITH TIME-POINT INFORMATION INDICATING THE TIME POINT IN A UNIT PERIOD

(71) Applicant: YAHOO JAPAN CORPORATION, Tokyo (JP)

(72) Inventors: Shinichiro Sega, Tokyo (JP); Shingo Hoshino, Tokyo (JP); Koji Tsukamoto, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 196 days.

(21) Appl. No.: 14/180,727

(22) Filed: Feb. 14, 2014

(65) Prior Publication Data

US 2014/0244553 A1     Aug. 28, 2014

(30) Foreign Application Priority Data

Feb. 28, 2013 (JP) .................................. 2013-039748

(51) Int. Cl.
G06N 99/00      (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

2007/0282766 A1* 12/2007 Hartman ............... G05B 13/048
                                                           706/15
2012/0172017 A1*  7/2012 Ratti ..................... G06Q 10/10
                                                          455/414.1

FOREIGN PATENT DOCUMENTS

JP       A-2012-141785        7/2012

OTHER PUBLICATIONS

Murakawa, M. et al., "Q-Learning Using RBF Networks in Nonstationary Environments," *The Transactions of the Institute of Electronics, Information and Communication Engineers (information and Systems II-Information Processing)*, Dec. 25, 1998, pp. 2828-2840, vol. 12 (with partial translation).

Takahashi, S. et al., "Speaker Adaptation of Acoustic Models Using Correlations of Transfer Vectors," *The Transactions of the Institute of Electronics, Information and Communication Engineers (information and Systems II-Information Processing)*, Mar. 25, 1999, pp. 324-331, No. 3 (with partial translation).

(Continued)

*Primary Examiner* — Kakali Chaki
*Assistant Examiner* — Mai T Tran
(74) *Attorney, Agent, or Firm* — Oliff PLC

(57) ABSTRACT

A machine learning apparatus includes an analytical information storage unit that stores therein two or more pieces of analytical information each associating input/output information used for machine learning with time-point information indicating a time point of the input/output information, an analysis-object-set specifying unit that specifies an analysis object set containing a unit-period input-output set being a set of pieces of the input/output information corresponding to pieces of the time-point information indicating the time point in a unit period and an amount of the pieces of the input/output information of the set being dependent on a period between the time point of the unit periods and a specific time point, and a machine learning unit that performs machine learning by using the pieces of the input/output information contained in the analysis object set.

13 Claims, 12 Drawing Sheets

(56) References Cited

OTHER PUBLICATIONS

Hayashi, H. et al., "Space Partitioning Method for Classifier Selection," *IEICE Technical Report* (*Pattern Recognition and Media Understanding*), Feb. 17, 2005, pp. 7-12, vol. 104, No. 669 (with partial translation).

Japanese Office Action issued in Japanese Patent Application No. 2013-039748 on Jun. 20, 2014 (with translation).

* cited by examiner

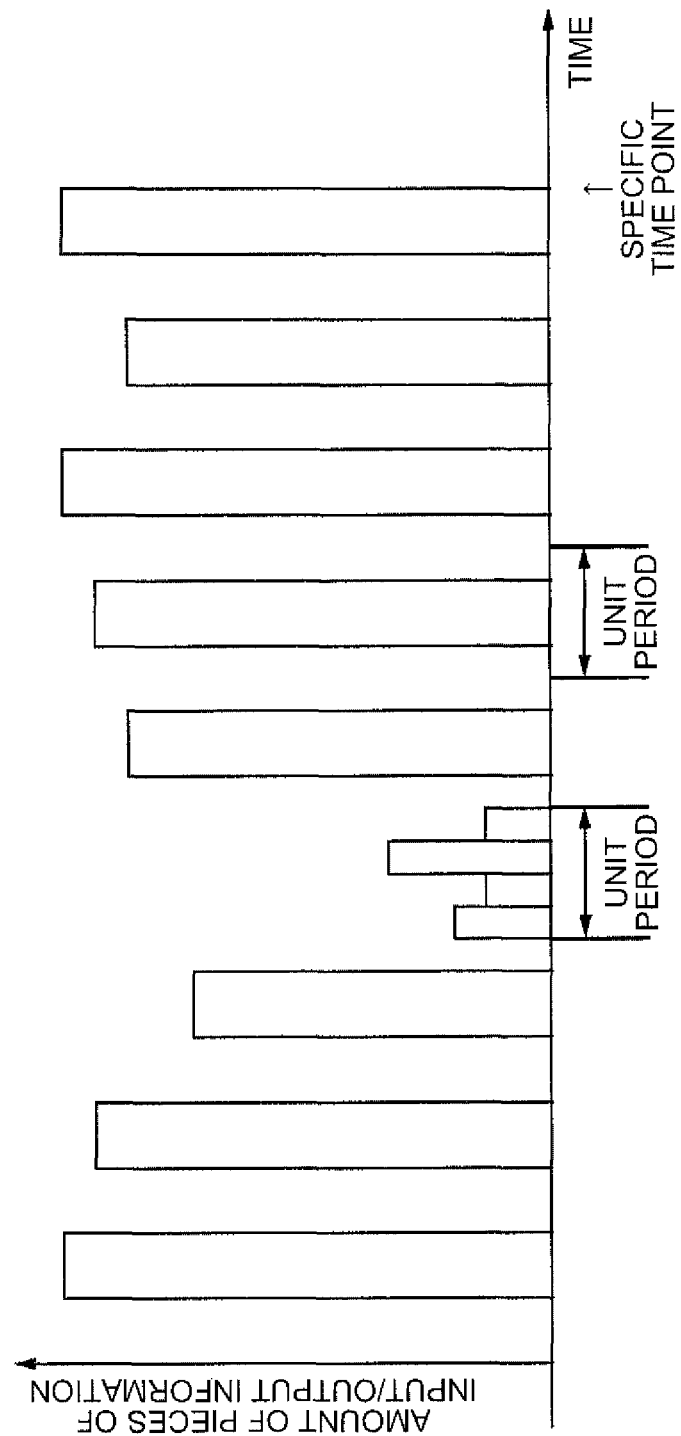

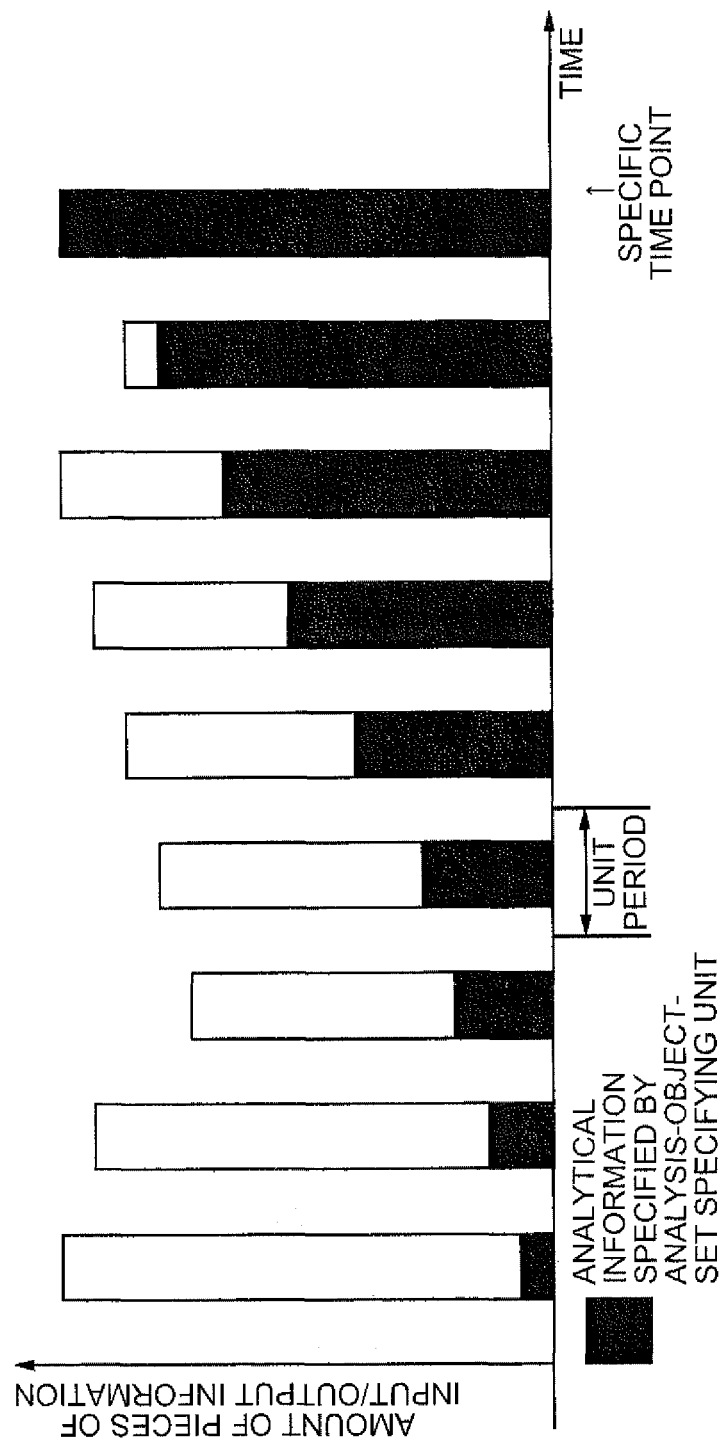

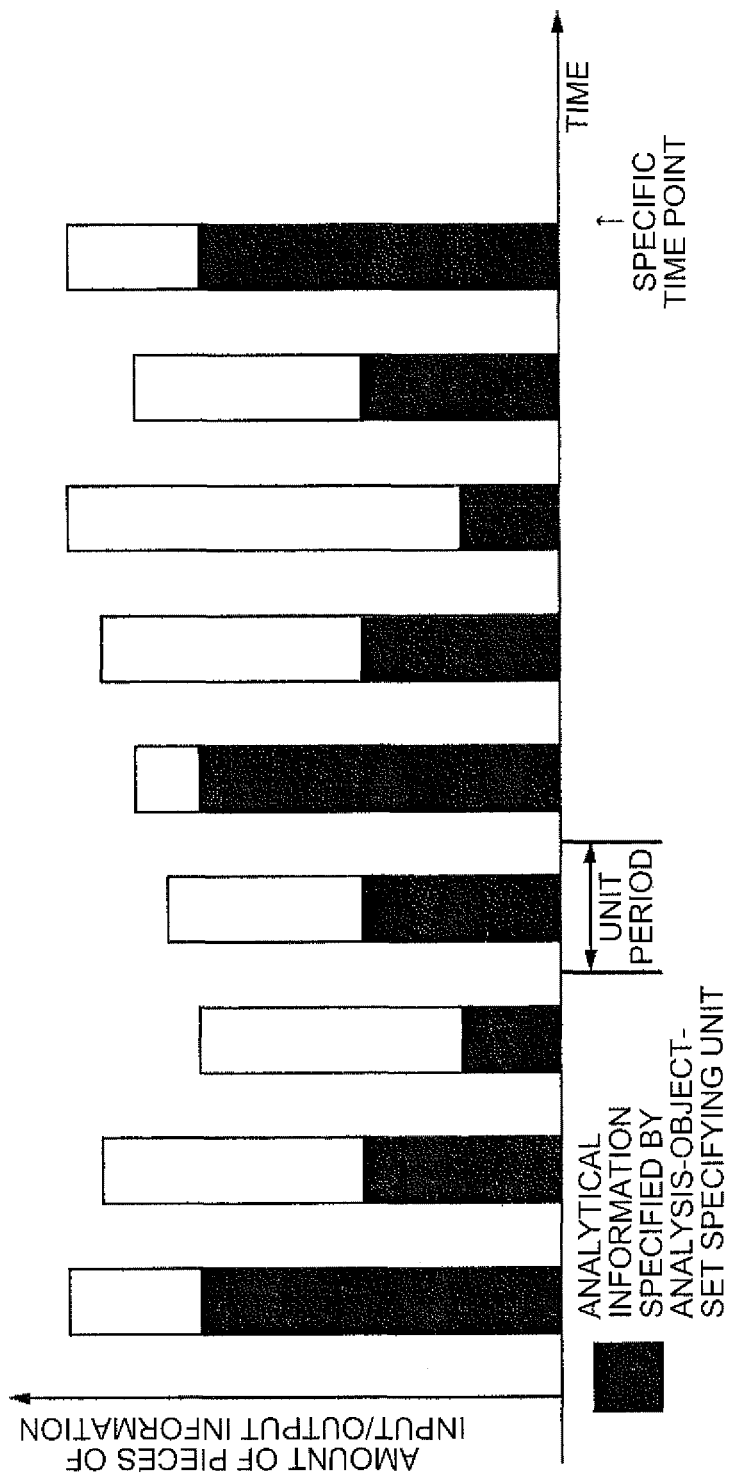

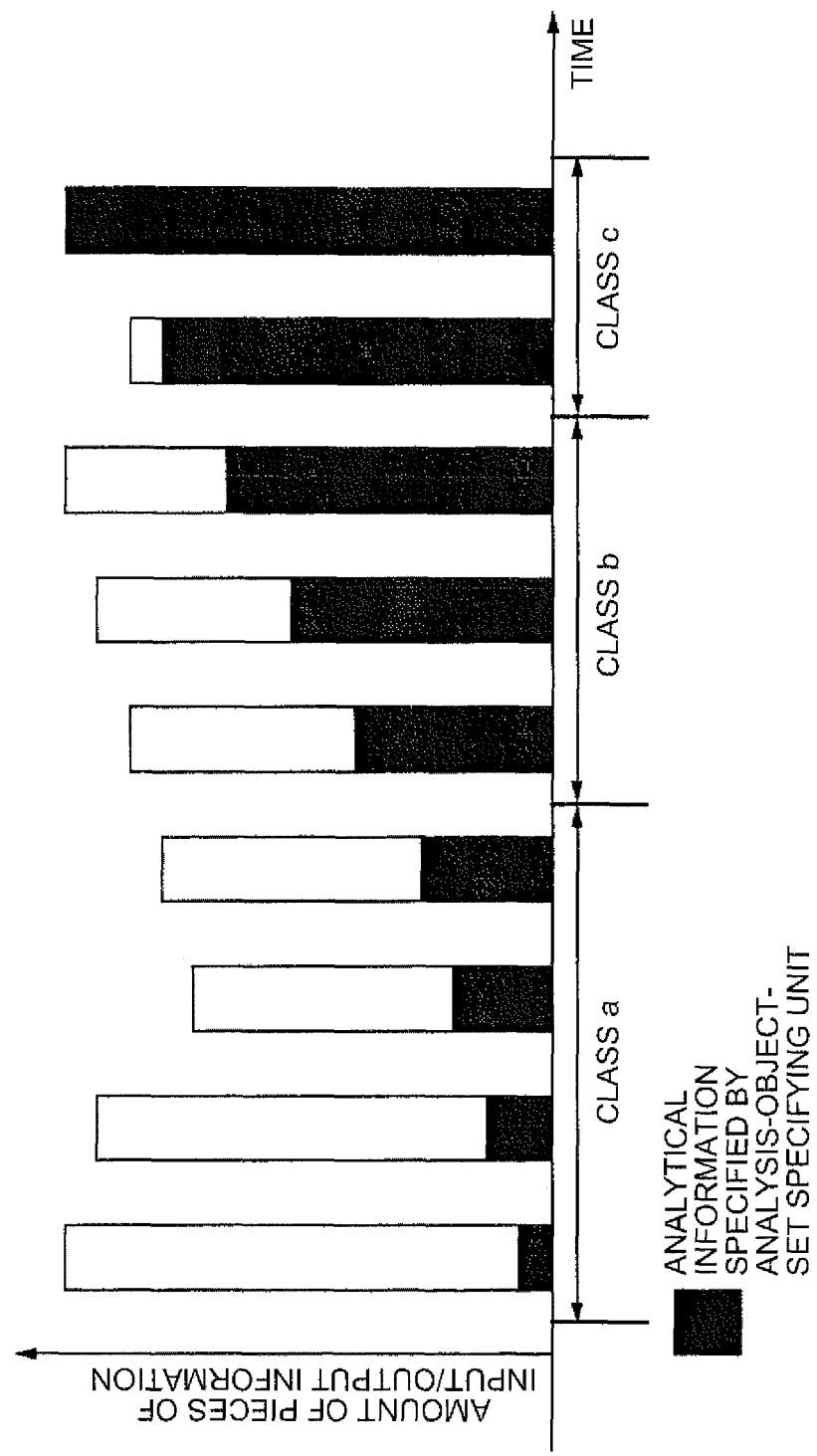

FIG.9

| ANALYTI-CAL INFOR-MATION ID | INPUT/OUTPUT INFORMATION ||||| TIME-POINT INFOR-MATION |
|---|---|---|---|---|---|---|
| | INPUT INFORMATION |||| OUTPUT INFORMATION | |
| | AGE | SEX (MALE: 1 FEMALE: -1) | NUMBER OF CLICKS OF PAST ADVER-TISEMENT | ... | CLICK OR NON-CLICK OF DISPLAYED ADVER-TISEMENT | |
| 1 | 24 | 1 | 3 | ... | 1 | 12/1 |
| 2 | 31 | 1 | 0 | ... | -1 | 12/1 |
| 3 | 42 | -1 | 0 | ... | -1 | 12/1 |
| 4 | 15 | 1 | 2 | ... | -1 | 12/1 |
| 5 | 18 | 1 | 10 | ... | 1 | 12/1 |
| 6 | 16 | -1 | 1 | ... | -1 | 12/1 |
| ⋮ | ⋮ | ⋮ | ⋮ | ⋮ | ⋮ | ⋮ |
| 1001 | 18 | 1 | 0 | ... | -1 | 12/11 |
| 1002 | 22 | -1 | 0 | ... | 1 | 12/11 |
| 1003 | 14 | 1 | 5 | ... | -1 | 12/11 |
| 1004 | 16 | 1 | 1 | ... | -1 | 12/11 |
| 1005 | 42 | 1 | 1 | ... | 1 | 12/11 |
| 1006 | 31 | 1 | 1 | ... | -1 | 12/11 |
| ⋮ | ⋮ | ⋮ | ⋮ | ⋮ | ⋮ | ⋮ |
| 2001 | 41 | -1 | 1 | ... | 1 | 12/21 |
| 2002 | 19 | -1 | 1 | ... | -1 | 12/21 |
| 2003 | 21 | 1 | 0 | ... | -1 | 12/21 |
| 2004 | 21 | 1 | 3 | ... | -1 | 12/21 |
| 2005 | 22 | 1 | 2 | ... | -1 | 12/21 |
| 2006 | 26 | 1 | 1 | ... | -1 | 12/21 |
| ⋮ | ⋮ | ⋮ | ⋮ | | ⋮ | ⋮ |

FIG.10

FIRST ANALYSIS OBJECT SET
  FIRST CLASS SERVES AS VERIFICATION CLASS
    81.3%
  SECOND CLASS SERVES AS VERIFICATION CLASS
    87.3%
  THIRD CLASS SERVES AS VERIFICATION CLASS
    79.3%

SECOND ANALYSIS OBJECT SET
  FIRST CLASS SERVES AS VERIFICATION CLASS
    76.0%
  SECOND CLASS SERVES AS VERIFICATION CLASS
    65.3%
  THIRD CLASS SERVES AS VERIFICATION CLASS
    70.0%

THIRD ANALYSIS OBJECT SET
  FIRST CLASS SERVES AS VERIFICATION CLASS
    93.3%
  SECOND CLASS SERVES AS VERIFICATION CLASS
    88.7%
  THIRD CLASS SERVES AS VERIFICATION CLASS
    85.3%
    ⋮

AVERAGE WHEN FIRST CLASS SERVES AS VERIFICATION CLASS
  83.5%
AVERAGE WHEN SECOND CLASS SERVES AS VERIFICATION CLASS
  80.4%
AVERAGE WHEN THIRD CLASS SERVES AS VERIFICATION CLASS
  78.2%

AVERAGE FOR FIRST ANALYSIS OBJECT SET
  82.6%
AVERAGE FOR SECOND ANALYSIS OBJECT SET
  70.3%
  ⋮

OVERALL AVERAGE
  81.4%

MACHINE LEARNING APPARATUS AND METHOD WITH TIME-POINT INFORMATION INDICATING THE TIME POINT IN A UNIT PERIOD

CROSS-REFERENCE TO RELATED APPLICATIONS

The present application claims priority to and incorporates by reference the entire contents of Japanese Patent Application No. 2013-039748 filed in Japan on Feb. 28, 2013.

BACKGROUND OF THE INVENTION

1. Field of the Invention

Embodiments described herein relate generally to a machine learning apparatus that performs machine learning and verifies a result of the machine learning.

2. Description of the Related Art

Conventionally, there have been developed apparatuses or the like that provide advertisements suitable for a user by using information on the user (see, for example, Japanese Laid-open Patent Publication No. 2012-141785).

However, in the conventional apparatuses or the like, in the machine learning, old information and new information are equally weighted when they are learned. Therefore, information at a desired time point to be focused on in the machine learning may not be learned preferentially.

SUMMARY OF THE INVENTION

It is an object of the present invention to at least partially solve the problems in the conventional technology.

According to one aspect of an embodiment, a machine learning apparatus includes an analytical information storage unit that stores therein two or more pieces of analytical information each associating a piece of input/output information containing information on input and information on output used for machine learning with a piece of time-point information indicating a time point of the input/output information; an analysis-object-set specifying unit that specifies an analysis object set containing a unit-period input-output set for unit periods divided in a period, the unit-period input-output set being a set of pieces of the input/output information corresponding to pieces of the time-point information indicating the time point in the unit periods and an amount of the pieces of the input/output information of the set being dependent on a period between the time point of the unit periods and a specific time point; and a machine learning unit that performs machine learning by using the pieces of the input/output information contained in the analysis object set specified by the analysis-object-set specifying unit.

According to another aspect of an embodiment, a method for machine learning using an analytical information storage unit, an analysis-object-set specifying unit and a machine learning unit, wherein the analytical information storage unit stores therein two or more pieces of analytical information each associating a piece of input/output information containing information on input and information on output used for the machine learning with a piece of time-point information indicating a time point of the input/output information, the method includes specifying, by the analysis-object-set specifying unit, an analysis object set containing a unit-period input-output set for unit periods divided in a period, the unit-period input-output set being a set of pieces of the input/output information corresponding to pieces of the time-point information indicating the time point in the unit periods and an amount of the pieces of the input/output information of the set being dependent on a period between the time point of the unit periods and a specific time point; and performing, by the machine learning unit, machine learning by using the pieces of the input/output information contained in the analysis object set specified at the specifying.

According to still another aspect of an embodiment, a computer-readable recording medium storing a program for a computer that is enabled to access an analytical information storage unit that stores therein two or more pieces of analytical information each associating a piece of input/output information containing information on input and information on output used for machine learning with a piece of time-point information indicating a time point of the input/output information, the program causing the computer to execute a process including, causing the computer to function as an analysis-object-set specifying unit that specifies an analysis object set containing a unit-period input-output set for unit periods divided in a period, the unit-period input-output set being a set of pieces of the input/output information corresponding to pieces of the time-point information indicating the time point in the unit periods and an amount of the pieces of the input/output information of the set being dependent on a period between the time point of the unit periods and a specific time point; and causing the computer to function as a machine learning unit that performs machine learning by using the pieces of the input/output information contained in the analysis object set specified by the analysis-object-set specifying unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram for explaining a unit period according to the first embodiment;

FIG. 4 is a diagram illustrating an example of an analysis object set specified by an analysis-object-set specifying unit according to the first embodiment;

FIG. 5 is a diagram illustrating an example of an analysis object set specified by the analysis-object-set specifying unit according to the first embodiment;

FIG. 8 is a diagram illustrating an example of an analysis object set divided by a class dividing unit according to the first embodiment;

FIG. 9 is a diagram illustrating an example of analytical information stored in an analytical information storage unit according to the first embodiment;

FIG. 10 is a diagram illustrating an example of a view of a screen output by an output unit according to the first embodiment;

DETAILED DESCRIPTION OF THE PREFERRED EMBODIMENTS

Figure 1:
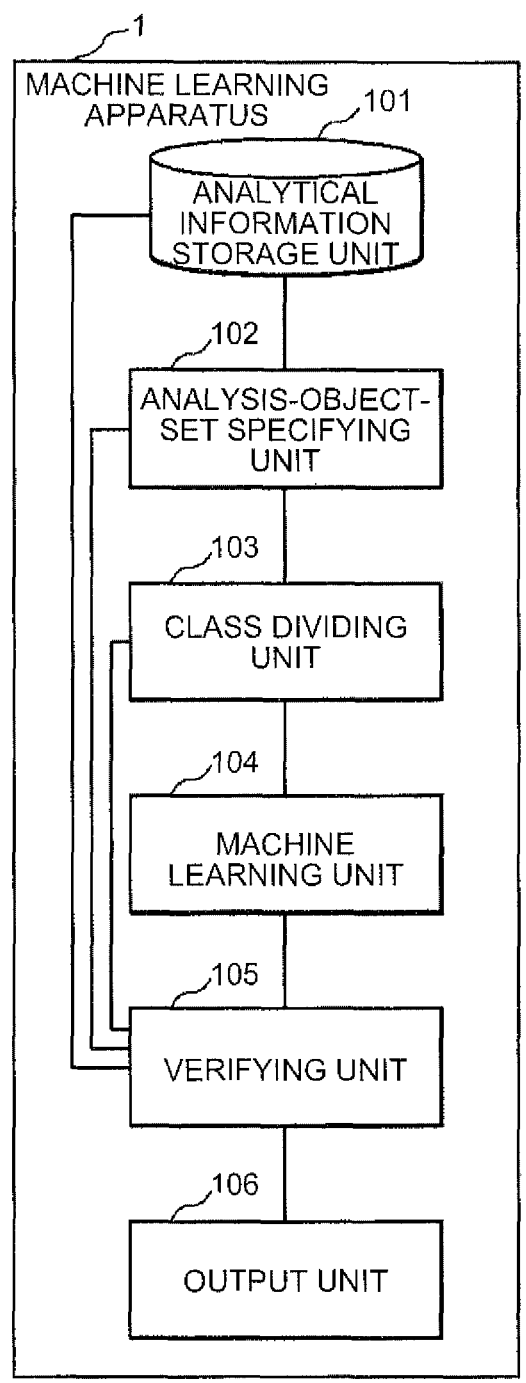
FIG. 1 is a block diagram of a machine learning apparatus according to a first embodiment.

Exemplary embodiments of a machine learning apparatus and the like will be explained below with reference to accompanying drawings. In the following embodiments, components denoted by the same reference numerals and symbols perform the same operation; therefore, the same explanation will be omitted appropriately.

First Embodiment

In a first embodiment, an explanation will be given of a machine learning apparatus 1 that performs machine learning by taking into account a time point of information used in the machine learning and verifies a result of the machine learning.

FIG. 1 is a block diagram of the machine learning apparatus 1 according to the first embodiment. The machine learning apparatus 1 includes an analytical information storage unit 101, an analysis-object-set specifying unit 102, a class dividing unit 103, a machine learning unit 104, a verifying unit 105 and an output unit 106.

The analytical information storage unit 101 stores therein two or more pieces of analytical information. The analytical information is information for associating a piece of input/output information with a piece of time-point information indicating a time point of the input/output information. The input/output information is information that is available for machine learning and that contains information on input and information on output. The input/output information available for machine learning need not always be used for machine learning. For example, the input/output information may be used to verify a result of machine learning. Incidentally, the input/output information may be any information as long as the information is available for supervised learning. Furthermore, the input/output information may be information whose status changes according to time. A change in the status according to time means that the status of output information corresponding to the same input information changes according to time. For example, when the input information indicates an attribute of a product and the output information indicates whether an advertisement of the product has been clicked, and if the product is a seasonal product, a click rate indicated by the output information may change according to time. In this case, the status of the input/output information changes according to time. The information on input may be such information that is used as it is for machine learning or may be such information that is used to acquire information used for machine learning or the like. The information on output may be such information that is used as it is for machine learning or may be such information that is used to acquire information used for machine learning or the like. The information used to acquire the information used for the machine learning or the like may be, for example, an ID or the like for identifying the information on input or the information on output used for the learning if the ID or the like is managed in an external storage unit (not illustrated) or an external storage device (not illustrated).

The time-point information may be information indicating a time point at which the input/output information is generated, a time point at which the input/output information is acquired, or a time point at which the input/output information is calculated. Furthermore, a time point indicated by the time-point information may have a predetermined length. For example, the length of the time point indicated by the time-point information may be one year, one month, one day, one hour, or other lengths. Furthermore, while it is preferable to make the units of the time points indicated by the pieces of the time-point information consistent, it is acceptable not to make the units of the time points consistent. Specifically, the time-point information may contain both of information indicating a year and information indicating a month.

In the following, each piece of the information contained in the analytical information stored in the analytical information storage unit 101 may be described as information contained in the analytical information storage unit 101. Specifically, the input/output information contained in the analytical information stored in the analytical information storage unit 101 may be described as input/output information stored in the analytical information storage unit 101. Furthermore, in the following, the information on input may be described as input information. Moreover, the information on output may be described as output information. Incidentally, the analytical information storage unit 101 may store therein only pieces of analytical information that are selected, as desired pieces of analytical information used for the machine learning, from a storage unit (not illustrated), an external storage device (not illustrated), or the like that stores therein a huge number of pieces of analytical information. The information may be selected based on a predetermined period or based on a period designated by an administrator, a user, or the like.

It is preferable to store, in the analytical information storage unit 101, pieces of the analytical information containing an adequate number of pieces of the input/output information used for the machine learning. It is preferable to employ a nonvolatile recording medium as the analytical information storage unit 101. However, the analytical information storage unit 101 may be implemented by a volatile recording medium. A process for storing the analytical information in the analytical information storage unit 101 may be arbitrary. For example, the analytical information may be stored in the analytical information storage unit 101 via a recording medium, the analytical information may be transmitted via a communication line or the like so as to be stored in the analytical information storage unit 101, or the analytical information may be input via an input device so as to be stored in the analytical information storage unit 101.

The analysis-object-set specifying unit 102 specifies an analysis object set containing unit-period input-output sets for multiple unit periods that are equally divided in a period. In the embodiments, to divide "equally" means to divide "substantially equally" that may include a small margin of error. The unit-period input-output set is a set of pieces of the input/output information corresponding to pieces of the time-point information indicating a time point in a unit period, and an amount of the pieces of the input/output information of the set depends on a period between the time point of the unit period and a specific time point. It is preferable that the unit period corresponds to length of the time point indicated by the time-point information stored in the analytical information storage unit 101. However, the unit period may be other than the length of the time point indicated by the time-point information. For example, the unit period may be one year, one month, one day, or other periods. Furthermore, the unit period may be changed depending on a type of the input/output information. The unit period may be one day, one week, or the like if the input/output information is about user's interest or the like; or may be one year, 10 years, or the like if the input/output information is about a change in earth's crust or the like. If the lengths of the time points indicated by pieces of the time-point information contained in pieces of the analytical information stored in the analytical information storage unit 101 differ from one another, as illustrated in FIG. 3 for example, the unit period may be a period used to assemble pieces of the time-point information indicating multiple time points into a piece of the time-point information indicating a time point of a single unit period. Incidentally, the analysis-object-set specifying unit 102 specifies pieces of the input/output information contained in pieces of the analytical information for each unit period. Therefore, it is preferable that each of the unit periods contains one or more pieces of the analytical information containing the time-point information indicating the time point in the unit period. Therefore, it is preferable that the unit period is the same length as or longer than the length of the time point indicated by the time-point information stored in the analytical information storage unit 101. This is because, if the unit period is shorter than the length of the time point indicated by the time-point information stored in the analytical information storage unit 101, it becomes difficult to specify pieces of the analytical information for each unit period or it becomes needed to divide the pieces of the analytical information into multiple unit periods. Incidentally, if the pieces of the analytical information are to be divided into multiple unit periods by necessity, the pieces of the analytical information may be divided at random, may be divided so as to assemble similar pieces of input/output information, or may be divided so as to distribute similar pieces of input/output information. Furthermore, a period to be divided into the unit periods may be a period including all of the time points indicated by the pieces of the time-point information stored in the analytical information storage unit 101, or may be a part of the period including all of the time points indicated by the pieces of the time-point information stored in the analytical information storage unit 101.

As described above, the unit-period input-output set is a set of pieces of the input/output information, in which the amount of the pieces of the input/output information depends on the period between the time point of the unit period corresponding to the unit-period input-output set and the specific time point. The specific time point is a reference point for specifying an analysis object set by the analysis-object-set specifying unit 102. The specific time point may be any time point corresponding to information indicating a time point in the period. The specific time point may be a predetermined time point, a time point designated by a predetermined rule, a time point set by a developer, a user, or the like, or a time point stored in a storage unit (not illustrated). The time point designated by a predetermined rule may be the latest time point or the oldest time point among the time points indicated by the pieces of the time-point information stored in the analytical information storage unit 101, or a time point (time) at which the analysis-object-set specifying unit 102 performs a process. "The period between the time point of the unit period and the specific time point" may be a length of time between these two time points, or may be information indicating the position of the time point of the unit period with respect to the specific time point, that is, a value obtained by "(the time point of the unit period)−(the specific time point)". The period between the two time points is represented by a value equal to or greater than zero in the former case, and by a positive value or a negative value in the latter case. The absolute value in the latter case is the same as the value in the former case. In the first embodiment, a case will be mainly explained that the period between the two time points indicates a period in the former case, that is, the period is represented by a value equal to or greater than zero. The amount dependent on, the period between the time point of the unit period and the specific time point may be determined by using, for example, a function $F(x)$ with an argument x. Specifically, the analysis-object-set specifying unit 102 may specify a unit-period input-output set corresponding to a certain unit period such that the unit-period input-output set contains a certain amount of pieces of the input/output information so as to correspond to a value obtained by assigning a period x between the time point of the unit period and the specific time point to the function $F(x)$. The amount of pieces of the input/output information contained in the unit-period input-output set may be increased as the period between the time point of the unit period of the unit-period input-output set and the specific time point decreases. In this case, as illustrated in FIG. 4 for example, it may be possible to specify pieces of the input/output information such that the amount of pieces of the input/output information contained in the analysis object set increases as a time point approaches the specific time point. In this case, the function $F(x)$ becomes a decreasing function with respect to the argument x. Alternatively, the analysis-object-set specifying unit 102 may specify a unit-period input-output set so as to contain the same number of pieces of the input/output information as the value obtained by adding an arbitrary value to the number of pieces of the input/output information contained in the previous unit-period input-output set, as the time point approaches the specific time point. The method to specify an analysis object set by using the decreasing function as described above is preferable when, for example, learning is performed to estimate a situation immediately after a specific time point, such as a release date of a new product. Furthermore, the amount of pieces of the input/output information contained in the unit-period input-output set may be changed periodically according to the period between the time point of the unit period of the unit-period input-output set and the specific time point. In this case, as illustrated in FIG. 5 for example, it may be possible to specify pieces of the input/output information such that the amount of pieces of the input/output information contained in the analysis object set periodically changes according to the period with respect to the specific time point. In this case, the function $F(x)$ becomes a periodic function with respect to the argument x. Alternatively, the analysis-object-set specifying unit 102 may specify a unit-period input-output set so that the same amount of pieces of the input/output information are contained in a unit period corresponding to the same remainder that is obtained by dividing the period between the specific time point and the time point of a certain unit period by a predetermined value. The method to specify an analysis object set by using the periodic function as described above is preferable when, for example, learning is performed to estimate a situation at a specific time point, such as Christmas Day, that is periodically repeated. Incidentally, the time point of the unit period may be any time point contained in the unit period. For example, the time point of the unit period may be a start time point of the unit period, an end time point of the unit period, or a middle time point of the unit period.

Figure 6A:
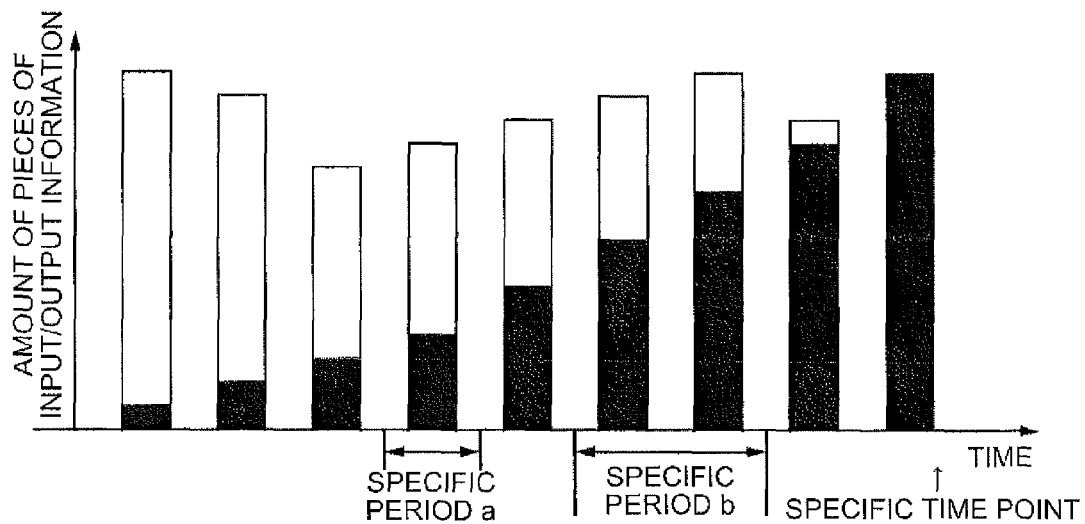
FIGS. 6A and 6B are diagrams illustrating an example of multiple analysis object sets specified by the analysis-object-set specifying unit according to the first embodiment.
Figure 6B:
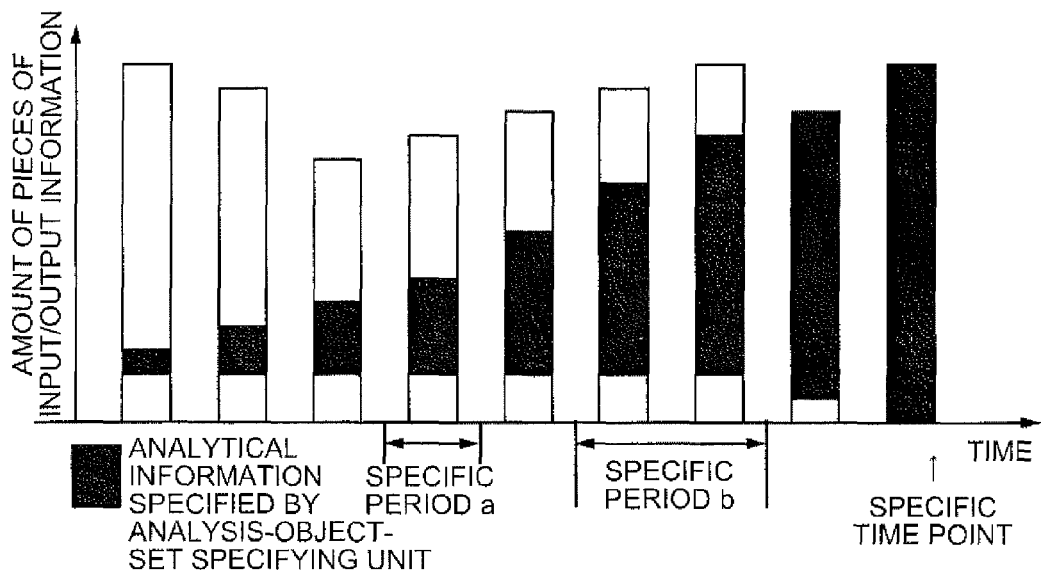

Furthermore, the analysis-object-set specifying unit 102 may arrange pieces of the input/output information in an order for each of the unit periods, and specify an analysis object set containing pieces of the input/output information that are to be contained in the unit-period input-output set, based on information indicating the order of the pieces of the input/output information arranged. For example, the analysis-object-set specifying unit 102 may specify each of the unit-period input-output sets by using a decreasing function and a horizontal axis as illustrated in FIG. 6A, or may specify each of the unit-period input-output sets by using a decreasing function and an increasing function as illustrated in FIG. 6B. As described above, the analysis-object-set specifying unit 102 may specify an analysis object set containing pieces of the input/output information contained in a region sandwiched by two or more functions or axes. Incidentally, "two or more functions or axes" may be designated in an arbitrary manner. Furthermore, the method to arrange the pieces of the input/output information for each of the unit periods may be arbitrary. As the method to arrange the pieces of the input/output information for each of the unit periods, the pieces of the information may be arranged in order from the earliest time point indicated by the time-point information corresponding to each piece of the input/output information, may be arranged in order from the latest time point, or may be arranged at random. Furthermore, the method to arrange the information may differ for each of the unit periods or the same for the unit periods.

Incidentally, the analysis-object-set specifying unit 102 may specify an analysis object set from only pieces of the input/output information corresponding to pieces of the time-point information indicating time prior to the specific time point, from only pieces of the input/output information corresponding to pieces of the time-point information indicating time after the specific time point, or from pieces of the input/output information corresponding to pieces of the time-point information indicating time prior to and after the specific time point. When specifying an analysis object set from the pieces of the input/output information corresponding to the pieces of the time-point information indicating time prior to and after the specific time point, the analysis-object-set specifying unit 102 may employ different methods to specify the analysis object set for time prior to the specific time point and for time after the specific time point, or may employ the same method. For example, the analysis-object-set specifying unit 102 may specify a greater number of pieces of the input/output information from among the pieces of the input/output information corresponding to the pieces of the time-point information indicating time prior to the specific time point along with a decrease in the period with respect to the specific time point, and may specify a smaller number of pieces of the input/output information from among the pieces of the input/output information corresponding to the pieces of the time-point information indicating time after the specific time point along with a decrease in the period with respect to the specific time point. Alternatively, the analysis-object-set specifying unit 102 may specify pieces of the input/output information in a manner opposite to the above, may specify a smaller number of pieces of the input/output information along with a decrease in the period with respect to the specific time point regardless of whether the time is prior to or after the specific time point, or may specify a greater number of pieces of the input/output information along with a decrease in the period with respect to the specific time point regardless of whether the time is prior to or after the specific time point. Furthermore, the analysis-object-set specifying unit 102 may specify two or more different analysis object sets as illustrated in FIGS. 6A and 6B. Details for specifying two or more analysis object sets will be described later. The two or more analysis object sets may be specified when the verifying unit 105 performs pseudo cross validation. The pseudo cross validation will be explained after explanation of specification of two or more analysis object sets.

Incidentally, values of various variables for specifying the analysis object set may arbitrarily be set by a developer, an administrator, or a user. The values of various variables may be, for example, a time point indicating the specific time point, may be a rate of change, such as the slope of the function used to specify the analysis object set, or may be a cycle or the like of a periodic function used to specify the analysis object set. If the user sets the values of various variables, a receiving unit (not illustrated) may receive designation of a change from the user. Furthermore, a changing unit (not illustrated) may change the values of various variables according to the received designation of a change. The designation of a change may be, for example, values of various variables or differences from current values of various variables. In general, the analysis-object-set specifying unit 102 may be implemented by a micro processing unit (MPU), a memory, or the like. The flow of processes performed by the analysis-object-set specifying unit 102 is generally implemented by software, and the software is recorded in a recording medium, such as a read-only memory (ROM). However, the flow of the processes may be implemented by hardware (dedicated circuit).

The class dividing unit 103 divides the pieces of the input/output information contained in the analysis object set specified by the analysis-object-set specifying unit 102 into multiple classes corresponding to respective class periods that are divided in a period. The pieces of the input/output information contained in each of the classes correspond to pieces of the time-point information indicating the time point in each of the class periods of the respective classes. The class period may be made up of multiple continuous unit periods, may be a single unit period, or may not be a unit period. If the class period is not the unit period, it is preferable that the class period is longer than the unit period and the length of the time point indicated by the time-point information stored in the analytical information storage unit 101. This is because, if the class period is shorter than the unit period and the length of the time point indicated by the time-point information stored in the analytical information storage unit 101, it becomes difficult to specify pieces of the input/output information corresponding to pieces of the time-point information indicating time points contained in the class period, or it becomes needed to divide the pieces of the input/output information into multiple class periods. If the pieces of the input/output information are to be divided into multiple class periods by necessity, the pieces of the input/output information may be divided at random, may be divided so as to assemble similar pieces of input/output information, or may be divided so as to distribute similar pieces of input/output information. Incidentally, the pieces of the input/output information divided by the class dividing unit 103 are used for machine learning by the machine learning unit 104 or verification by the verifying unit 105; therefore, each class needs to contain at least one piece of the input/output information.

The class dividing unit 103 may divide, as illustrated in FIG. 8, the pieces of the input/output information such that the amount of pieces of the input/output information contained in each of the classes becomes the same or different. The class dividing unit 103 may set the class periods such that a single class contains a predetermined amount of pieces of the input/output information. Incidentally, even when the pieces of the input/output information are to be divided such that the amount of the pieces of the input/output information contained in each of the classes can be the same, if it is difficult to perfectly equally divide the pieces of the input/output information because of the length of a unit period or the amount of pieces of information contained in the analysis object set, the class dividing unit 103 may allow for a small margin of error or may exclude some pieces of the input/output information from a class in order to achieve the same amount. In the embodiments, the "same" amount means the "substantially same" amount that may include a small margin of error. Furthermore, the class dividing unit 103 may divide, for multiple analysis object sets, pieces of the input/output information contained in each of the analysis object sets. The way to divide, for the multiple analysis object sets, the pieces of the input/output information contained in each of the analysis object sets will be described later. In general, the class dividing unit 103 may be implemented by an MPU, a memory, or the like. The flow of processes performed by the class dividing unit 103 is generally implemented by software, and the software is recorded in a recording medium, such as a ROM. However, the flow of the processes may be implemented by hardware (dedicated circuit).

The machine learning unit 104 performs machine learning by using the pieces of the input/output information contained in the analysis object set specified by the analysis-object-set specifying unit 102. The machine learning unit 104 may perform the machine learning by using some of the pieces of the input/output information contained in the analysis object set specified by the analysis-object-set specifying unit 102. Some of the pieces of the input/output information may be pieces of the input/output information contained in some of the classes divided by the class dividing unit 103, or may be pieces of the input/output information randomly selected from the analysis object set. The machine learning unit 104 performs the machine learning by using, as a pair, a feature obtained based on input information contained in the input/output information, and output information corresponding to the input information. The feature may be the input information, a part of the input information, information calculated based on the input information, information associated with an ID if the input information is the ID, or vector data converted from the above information. The algorithm of the machine learning may be arbitrary as long as it is for supervised learning. For example, the algorithm of the machine learning may be a neural network, a support vector machine (SVM), or support vector regression (SVR). The above algorithms are well-known; therefore, explanation thereof will be omitted.

The machine learning unit 104 may repeat the machine learning using pieces of the input/output information contained in classes other than a verification class that is a single class used for verification in the analysis object set specified by the analysis-object-set specifying unit 102, in such a manner that all of the classes may be employed as the verification classes. Incidentally, the pieces of the input/output information contained in the verification class serve as pieces of verification information. Namely, the machine learning unit 104 may perform the machine learning as many times as the number of the classes divided by the class dividing unit 103. In general, the machine learning unit 104 may be implemented by an MPU, a memory, or the like. The flow of processes performed by the machine learning unit 104 is generally implemented by software, and the software is recorded in a recording medium, such as a ROM. However, the flow of the processes may be implemented by hardware (dedicated circuit).

The verifying unit 105 verifies a result of the machine learning performed by the machine learning unit 104, by using pieces of the input/output information other than the pieces of the input/output information used for the machine learning by the machine learning unit 104 in the analysis object set specified by the analysis-object-set specifying unit 102. Namely, if a part of the analysis object set is used for the learning, the verifying unit 105 verifies a result of the learning by using remaining pieces of the input/output information in the analysis object set used for the learning. The verifying unit 105 may input, to the machine learning unit 104 that has completed the machine learning, features that are obtained from pieces of the input information serving as pieces of the verification information in the same manner as the machine learning unit 104, and may verify whether the same values as pieces of the output information serving as the pieces of the verification information are output or whether values close to the pieces of the output information serving as the pieces of the verification information are output. Furthermore, the verifying unit 105 may acquire, as a verification result, the number of outputs of correct results, may calculate a rate by dividing the number of outputs of correct results by the number of pieces of the verification information, may acquire a two-level evaluation result indicating a proper result or an improper result based on the number of outputs or based on the rate, or may acquire a multi-level evaluation result based on the number of outputs or based on the rate.

The verifying unit 105 may perform cross validation by performing multiple verifications on respective results of machine learnings performed by the machine learning unit 104, by using the pieces of the input/output information contained in the verification class at the time of each machine learning. Incidentally, when the verifying unit 105 performs the cross validation, it may be possible to acquire a verification result of the cross validation that is a verification result obtained by merging verification results acquired using the respective verification classes. The verification result of the cross validation may be the number of outputs of correct results, a rate obtained by dividing the number of outputs of correct results by the number of pieces of the verification information, a two-level evaluation result indicating a proper result or an improper result based on the number of outputs or based on the rate, a multi-level evaluation result based on the number of outputs or based on the rate, the number of correct results among all of the verification results, or the number of incorrect results among all of the verification results. In general, the verifying unit 105 may be implemented by an MPU, a memory, or the like. The flow of processes performed by the verifying unit 105 is generally implemented by software, and the software is recorded in a recording medium, such as a ROM. However, the flow of the processes may be implemented by hardware (dedicated circuit).

A case will be explained below that the analysis-object-set specifying unit 102 specifies multiple analysis object sets. The analysis-object-set specifying unit 102 may specify multiple analysis object sets such that the amount of pieces of the input/output information contained in each of predetermined specific periods can be the same between the analysis object sets, and such that at least some of the pieces of the input/output information contained in at least any of the specific periods can be different between the analysis object sets. It is preferable that the specific period is the same as the unit period in order to perform the machine learning and the verification with high accuracy. However, the specific period may be multiple continuous unit periods, or a predetermined arbitrary period as illustrated in FIGS. 6A and 6B. The specific period is a period used to eliminate a bias in the amount of pieces of information in the same period between a process performed on a certain analysis object set and a process performed on a different analysis object set when the machine learning unit 104 performs learning and the verifying unit 105 performs verification. It is preferable that the specific period is the same length as or longer than the unit period and the length of the time point indicated by the time-point information stored in the analytical information storage unit 101. This is because, if the specific period is shorter than the unit period and the length of the time point indicated by the time-point information stored in the analytical information storage unit 101, it becomes difficult to specify pieces of the analytical information for each specific period or it becomes needed to divide the pieces of the analytical information into multiple unit periods. Incidentally, if the pieces of the analytical information are to be divided into multiple unit periods by necessity, the pieces of the analytical information may be divided at random, may be divided so as to assemble similar pieces of input/output information, or may be divided so as to distribute similar pieces of input/output information. The periods indicated by the respective specific periods may or may not overlap with one another among the multiple specific periods. Furthermore, the reason why the specific period and the unit period differ from each other is that it is sufficient that the amount of the pieces of the input/output information contained in the specific period eventually becomes the same between the analysis object sets and the specific period need not be the same as the unit period.

Figure 7A:
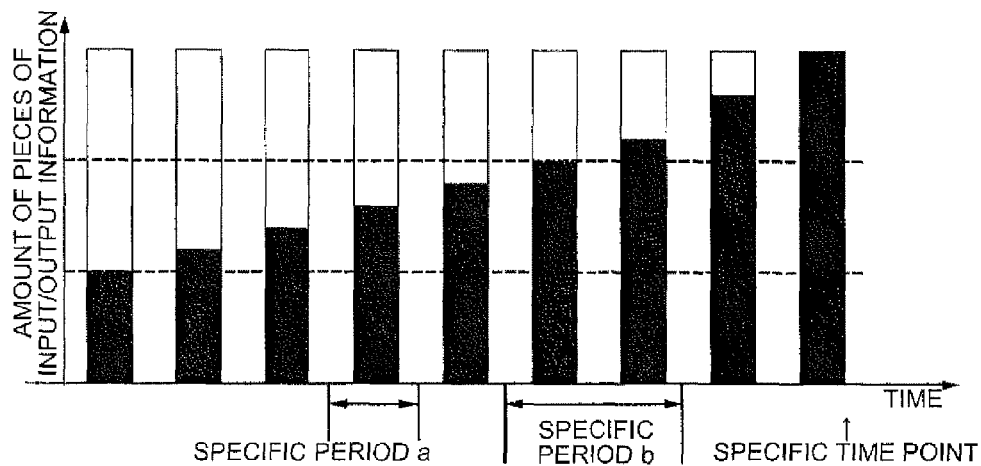
FIGS. 7A to 7C are diagrams illustrating an example of multiple analysis object sets specified by the analysis-object-set specifying unit according to the first embodiment.
Figure 7B:
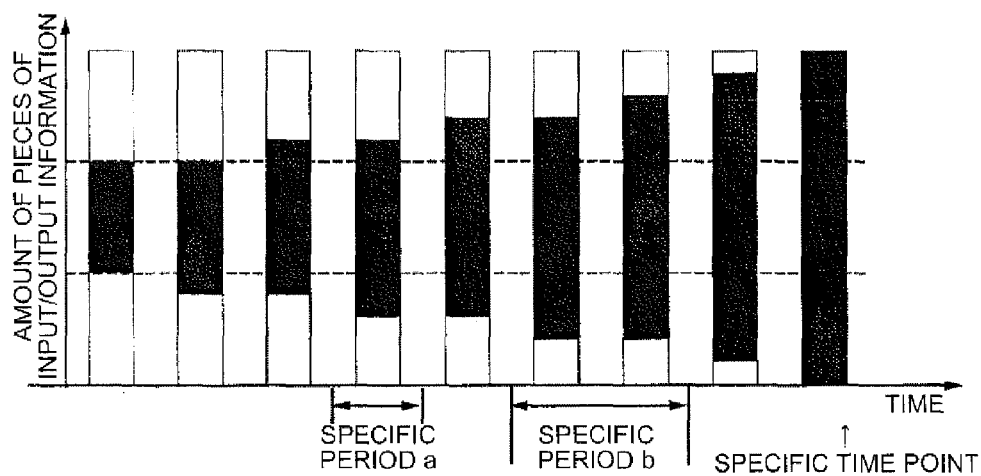
Figure 7C:
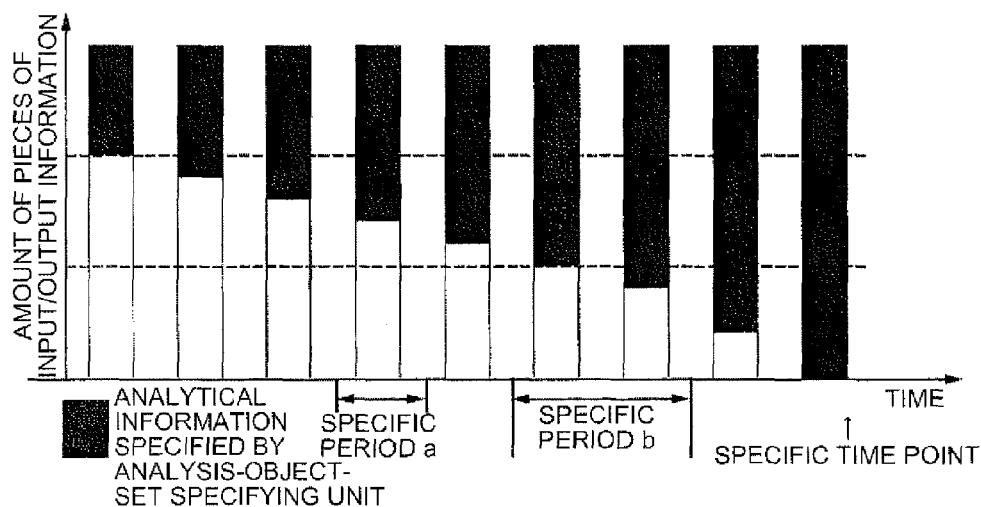

To specify multiple analysis object sets, as illustrated in FIGS. 7A to 7C for example, the analysis-object-set specifying unit 102 may specify multiple analysis object sets such that each of the pieces of the input/output information can be contained at least once in any of the analysis object sets. Incidentally, FIGS. 7A to 7C illustrate cases in which the same amount of the pieces of the analytical information is contained in each of the unit periods for convenience of explanation. The amount of the pieces of the input/output information contained in each of the unit periods may be different or the same between the unit periods. When specifying multiple analysis object sets, the analysis-object-set specifying unit 102 may assign a flag or the number of selections to each piece of the input/output information contained in the analysis object sets, and may specify multiple analysis object sets such that each of the pieces of the input/output information can be selected once or more. Furthermore, in this case, the analysis-object-set specifying unit 102 may select pieces of the input/output information in an unbiased way so as not to select some of the pieces of the input/output information many times when specifying the analysis object sets. Incidentally, the minimum number of the analysis object sets to be specified by the analysis-object-set specifying unit 102 such that each of the pieces of the input/output information can be selected once or more corresponds to the maximum value among values obtained by dividing the amount of all of the pieces of the input/output information contained in the specific period by the amount of the pieces of the input/output information selected in the specific period, for each of the specific periods.

Furthermore, the analysis-object-set specifying unit 102 may select multiple analysis object sets such that the amount of the pieces of the input/output information contained in each of the unit periods becomes the same between the analysis object sets, and such that each of the analysis object sets contains randomly-selected pieces of the input/output information. Namely, the analysis-object-set specifying unit 102 may specify multiple analysis object sets, in which the amount of the pieces of the input/output information contained in each of the unit-period input-output sets is the same.

When the analysis-object-set specifying unit 102 specifies the multiple analysis object sets, the class dividing unit 103 may divide the pieces of the input/output information for each of the analysis object sets. It is preferable that the class dividing unit 103 divides the pieces of the input/output information by using the same class period for all of the analysis object sets. However, it may be possible to divide the pieces of the input/output information by using different class periods.

When the analysis-object-set specifying unit 102 specifies the multiple analysis object sets, the machine learning unit 104 may perform the machine learning by using pieces of information other than the pieces of the verification information being the pieces of the input/output information used for the verification in each of the analysis object sets specified by the analysis-object-set specifying unit 102.

Furthermore, the machine learning unit 104 may repeat the machine learning using pieces of the input/output information other than the pieces of the verification information being the pieces of the input/output information contained in a verification class that is a single class used for verification, in such a manner that the classes corresponding to class periods that differ for each of the analysis object sets can be employed as the verification class and until the classes corresponding to all of the class periods can be employed as the verification classes. Specifically, the machine learning unit 104 may perform the machine learning once for each of the analysis object sets specified by the analysis-object-set specifying unit 102. In this case, the machine learning unit 104 may change the class period of the verification class for each machine learning. Incidentally, if the class period of the verification class is changed for each machine learning, the machine learning unit 104 may perform the machine learning such that each of the class periods serves as the verification class once. The order of the class periods selected as the verification classes by the machine learning unit 104 may be arbitrary. If the number of the analysis object sets is greater than the number of types of the class periods, the machine learning unit 104 may perform the machine learning as many times as the number of the analysis object sets by using verification classes of overlapping class periods, or may perform the machine learning as many times as the number of the types of the class periods by using verification classes such that the class periods do not overlap one another. Furthermore, if the number of the analysis object sets is smaller than the number of the types of the class periods, the machine learning unit 104 may perform the machine learning as many times as the number of the class periods by using the same analysis object set twice or more, or may perform the machine learning as many times as the number of the analysis object sets without using some of the class periods. Incidentally, the class periods and the analysis object sets to be used or not to be used may be determined at random or in sequence. Moreover, if the number of the types of the class periods and the number of the analysis object sets do not match each other, the machine learning unit 104 may cause the class dividing unit 103 to divide the pieces of the information again so that the number of the types of the class periods and the number of the analysis object sets match each other.

When the analysis-object-set specifying unit 102 specifies multiple analysis object sets, the verifying unit 105 verifies a result of each machine learning performed by the machine learning unit 104, by using the verification information used at the time of the machine learning.

When the analysis-object-set specifying unit 102 specifies multiple analysis object sets, the verifying unit 105 may perform pseudo cross validation on each of the analysis object sets. In the pseudo cross validation, verification results of the respective analysis object sets are merged. Incidentally, the verifying unit 105 may acquire a verification result of cross validation that is obtained by merging verification results employing classes with the same class period as the verification classes, or may acquire a verification result of cross validation that is obtained by merging verification results employing all of the classes as the verification classes. Furthermore, when the machine learning unit 104 performs the machine learning once for each of the analysis object sets, the verifying unit 105 may merge the verification results of the respective machine learnings.

The output unit 106 outputs the verification results verified by the verifying unit 105. The output is a concept including display on a display, projection by using a projector, printing by a printer, sound output, transmission to an external device, storage in a recording medium, transfer of a processing result to other processing devices or other programs. The output unit 106 may or may not include an output device, such as a display or a speaker. The output unit 106 may be implemented by driver software of the output device, or both of the driver software of the output device and the output device, or the like.

Figure 2:
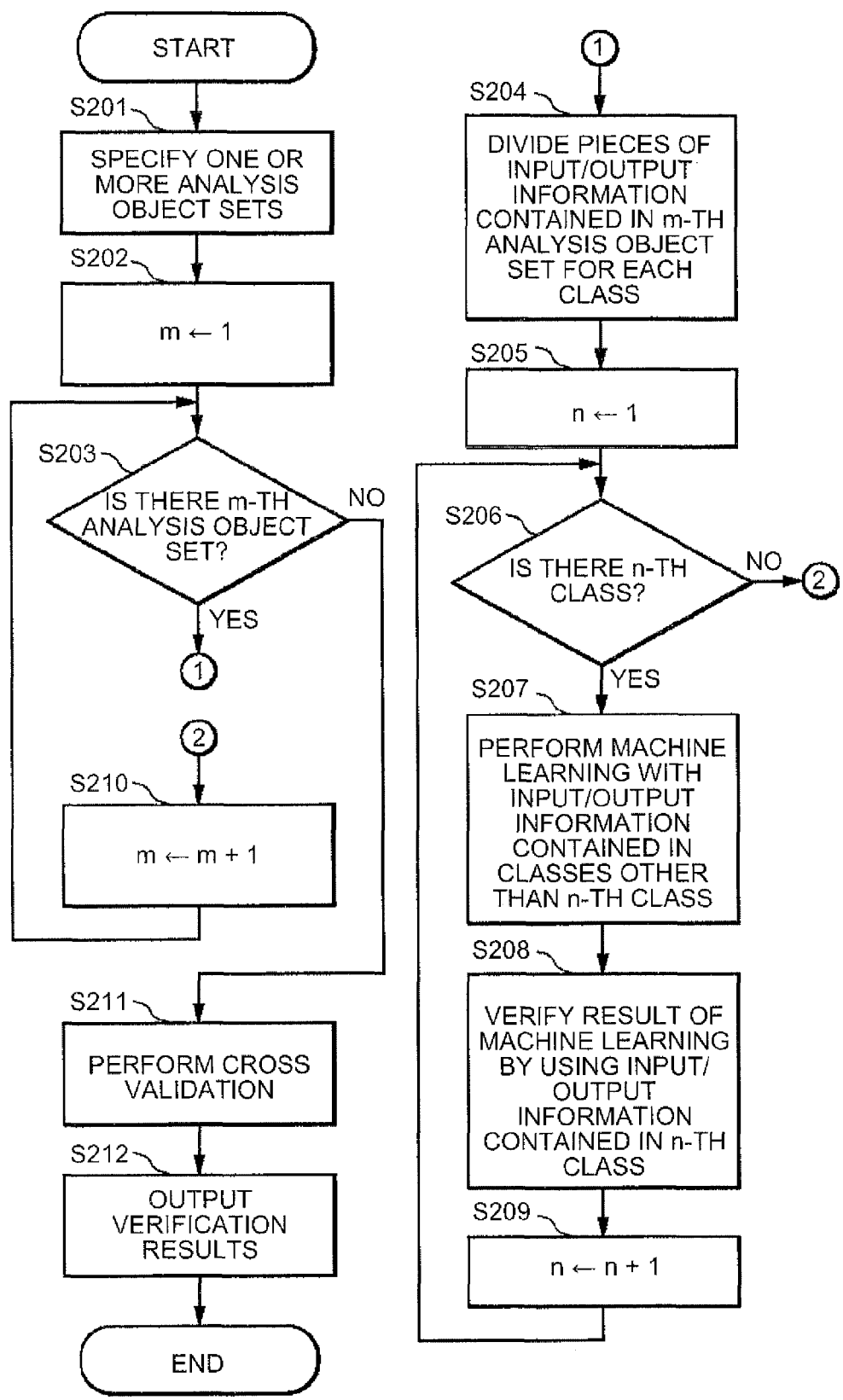
FIG. 2 is a flowchart illustrating operation of the machine learning apparatus according to the first embodiment.

FIG. 2 is a flowchart illustrating an example of operation of the machine learning apparatus 1 according to the first embodiment. The operation will be explained below with reference to FIG. 2.

(Step S201) The analysis-object-set specifying unit 102 acquires one or more analysis object sets from the pieces of the input/output information contained in the pieces of the analytical information stored in the analytical information storage unit 101.

(Step S202) The class dividing unit 103 assigns one to a counter m.

(Step S203) The class dividing unit 103 determines whether there is an m-th analysis object set. If there is the m-th analysis object set, the process proceeds to Step S204. If there is no m-th analysis object set, the process proceeds to Step S211.

(Step S204) The class dividing unit 103 divides pieces of input/output information into two or more classes such that the amounts of pieces of input/output information contained in the m-th analysis object set become the same.

(Step S205) The machine learning unit 104 assigns one to a counter n.

(Step S206) The machine learning unit 104 determines whether there is an n-th class. If there is the n-th class; the process proceeds to Step S207. If there is no n-th class, the process proceeds to Step S210.

(Step S207) The machine learning unit 104 performs machine learning by using pieces of input/output information contained in classes other than the n-th class.

(Step S208) The verifying unit 105 verifies a result of the machine learning performed at Step S207, by using pieces of input/output information contained in the n-th class.

(Step S209) The machine learning unit 104 increments the counter n by one. Then, the process returns to Step S206.

(Step S210) The class dividing unit 103 increments the counter m by one. Then, the process returns to Step S203.

(Step S211) The verifying unit 105 acquires a verification result of cross validation that is a verification result obtained by merging the verification results of the respective analysis object sets, a verification result obtained by merging the verification results of the respective classes, and a verification result obtained by merging all of verification results.

(Step S212) The verification results acquired at Step S208 and Step S211 are output. Then, the process is terminated.

Detailed operation of the machine learning apparatus 1 according to the first embodiment will be explained below. Incidentally, information in the drawings referred to in the concrete example below is provided for convenience of explanation, and is not actual data. Furthermore, the machine learning apparatus 1 explained in the concrete example is an apparatus that can be used to determine whether it is appropriate to provide an advertisement of a product to a certain user. The machine learning apparatus 1 in the concrete example uses information on a user as the input information and uses information on whether an advertisement has been clicked as the output information when performing machine learning and verifying a result of the machine learning. Moreover, in the concrete example, each of a length of the time-point information and a period indicated by the unit period is one day.

In the concrete example, it is assumed that a table illustrated in FIG. 9 is stored in the analytical information storage unit 101. The table in FIG. 9 is information on a click state of an advertisement of a certain product, and contains an analytical information ID, input/output information, and time-point information. Incidentally, the input/output information contains information on input and information on output. Furthermore, the information on input contains age, sex, the number of clicks of an advertisement provided in the past, and the like, with regard to a user. Moreover, the information on output is a value indicating whether the user indicated by the information on input of the same record has clicked the advertisement of the product at a time point indicated by the time-point information of the same record. For example, in the analytical information storage unit 101, an analytical information ID of "1", age of "24", sex of "1", the number "3" of clicks of the advertisement provided in the past, a value of "1" indicating whether a displayed advertisement is clicked, and time-point information of "December 1st" are registered. Incidentally, as for the value of sex, "1" indicates a male and "−1" indicates a female. Furthermore, as for the value indicating whether the displayed advertisement is clicked, "1" indicates that the advertisement is clicked and "−1" indicates that the advertisement is not clicked. Meanwhile, it is assumed that the analytical information storage unit 101 stores therein pieces of analytical information containing pieces of time-point information of December 1st to December 21st.

It is assumed that the user turns on the machine learning apparatus 1 and starts machine learning and verification of the machine learning. The analysis-object-set specifying unit 102 randomly selects two pieces of analytical information from among pieces of analytical information containing the time-point information of "December 1st" in the analytical information storage unit 101, and obtains a unit-period input-output set of pieces of input/output information contained in the two pieces of the analytical information. It is assumed that the first unit-period input-output set contains a piece of input/output information corresponding to the analytical information ID of "1". Furthermore, the analysis-object-set specifying unit 102 randomly selects four pieces of analytical information from among pieces of analytical information containing time-point information of "December 2nd" in the analytical information storage unit 101, and further obtains a unit-period input-output set of pieces of input/output information contained in the four pieces of the analytical information. It is assumed that the second unit-period input-output set contains pieces of input/output information corresponding to the analytical information IDs of "120" and "122". Moreover, similarly to the above, the analysis-object-set specifying unit 102 randomly selects as many pieces of analytical information as (date×2) from among pieces of analytical information containing the time-point information indicating each of December 3rd to December 21st, and obtains respective unit-period input-output sets. Then, the analysis-object-set specifying unit 102 specifies an analysis object set containing all of the obtained unit-period input-output sets. Furthermore, the analysis-object-set specifying unit 102 assigns a flag to each piece of the input/output information contained in the specified analysis object set. Then, the analysis-object-set specifying unit 102 selects pieces of input/output information without the flags if at all possible, and specifies the second or later analysis object set. The analysis-object-set specifying unit 102 repeats the above process twenty times and assumes that each of the pieces of the input/output information have been contained in any of the analysis object sets. Namely, the analysis-object-set specifying unit 102 specifies twenty analysis object sets (Step S201).

The class dividing unit 103 equally divides the pieces of the input/output information so that 150 pieces of the input/output information can be contained in each class. Due to the division, a period from December 1st to December 21st is divided into a class period from December 1st to December 12th, a class period from December 13th to December 17th, and a class period from December 18th to December 21st. Incidentally, although 156 pieces of the input/output information are contained in each of the class period from December 1st to December 12th and the class period from December 18th to December 21st, six pieces of the input/output information are randomly-excluded from each of the classes in order to equalize the amount of the pieces of the input/output information contained in each of the verification classes. Then, the class dividing unit 103 divides the pieces of the input/output information contained in the first analysis object set into corresponding class periods (Step S202 to Step S204). With this division, the pieces of the input/output information corresponding to, for example, the analytical information ID of "1", the analytical information ID of "120", and the analytical information ID of "122" are contained in the first class. Then, the machine learning unit 104 performs machine learning by using all pieces of the input/output information contained in the second class and the third class (Step S205 to Step S207).

The verifying unit 105 first inputs the input information corresponding to the analytical information ID of "1" to the machine learning unit 104 after the learning and causes the machine learning unit 104 to output a result. Then, the verifying unit 105 verifies whether the result matches the output information of "1" corresponding to the analytical information ID of "1". In this case, it is assumed that a result of applying a machine learning result is "1" and matches the output information. Similarly, the verifying unit 105 confirms match or mismatch with the output information by using the input/output information corresponding to the analytical information ID of "120", the input/output information corresponding to the analytical information ID of "122", and other of the pieces of the input/output information contained in the first class. In this example, it is assumed that results of 122 pieces of the input/output information among 150 pieces of the input/output information have matched. Then, the verifying unit 105 acquires an accuracy rate of 81.3% when the first class is used as the verification information for the first analysis object set (Step S208).

The machine learning unit 104 and the Verifying unit 105 performs the same verification for the case where the second class is used as the verification information in the first analysis object set and for the case where the third class is used as the verification information in the first analysis object set (Step S206 to Step S209). Then, the machine learning unit 104 and the verifying unit 105 perform machine learning and verification by using each class as the verification information for each of the second analysis object set and the third analysis object set in the same manner as above (Step S203 to Step S210).

Subsequently, the verifying unit 105 acquires a verification result obtained by merging verification results of the respective analysis object sets, a verification result obtained by merging verification results of the respective classes, and a verification result obtained by merging all of the verification results (Step S211). Then, when the verifying unit 105 completes the verification process, the output unit 106 outputs the verification results (Step S212). As a result, a view as illustrated in FIG. 10 is displayed on a display of the machine learning apparatus 1.

As described above, according to the first embodiment, the analysis-object-set specifying unit 102 may specify an analysis object set by taking into account a time point of the input/output information. Therefore, it becomes possible to preferentially learn information on a time point near a desired time point to be focused on in the machine learning. Consequently, it becomes possible to perform machine learning with high accuracy. Furthermore, according to the first embodiment, the verifying unit 105 may verify a result of the machine learning. Therefore, it becomes possible to obtain a guideline for correction when a specification method employed by the analysis-object-set specifying unit 102 has a problem. Moreover, according to the first embodiment, the analysis-object-set specifying unit 102 may specify an analysis object set by giving a higher priority to the input/output information containing the time-point information indicating a time point closer to a specific time point. Therefore, it becomes possible to effectively learn information that changes with respect to the specific time point. For example, it becomes possible to effectively learn information about user's interest in a new product, or the like. Furthermore, according to the first embodiment, the analysis-object-set specifying unit 102 may specify an analysis object set containing pieces of the input/output information that are obtained such that the amount of the pieces of the input/output information periodically changes depending on a period with respect to the specific time point. Therefore, it becomes possible to effectively learn information whose influence on a specific time point periodically changes. For example, it becomes possible to effectively learn information about user's interest in Christmas Day in each year, or the like. Moreover, according to the first embodiment, the analysis-object-set specifying unit 102 may specify multiple analysis object sets such that each of the pieces of the input/output information is contained at least once in any of the analysis object sets. Therefore, it becomes possible to perform machine learning by using all of the pieces of the input/output information, for example. Furthermore, according to the first embodiment, the analysis-object-set specifying unit 102 may specify multiple analysis object sets so as to contain randomly-selected pieces of the input/output information. Therefore, it becomes possible to perform machine learning without bias in the pieces of the input/output information in each unit period, for example. Moreover, according to the first embodiment, the machine learning unit 104 may perform machine leaning once by changing a class period of the verification class for each of the analysis object sets. Therefore, it becomes possible to perform adequate machine learning through a reduced number of learnings. Furthermore, according to the first embodiment, the analysis-object-set specifying unit 102 may specify multiple different analysis object sets. Therefore, it becomes possible to perform learning by using information excluded from one of the analysis object sets, too. Consequently, it becomes possible to reduce fluctuation due to a method of specifying the analysis object set, for example. Moreover, according to the first embodiment, the class dividing unit 103 may divide the pieces of the input/output information into multiple classes, and the verifying unit 105 may perform verification by switching between the pieces of the input/output information for each of the classes. Therefore, it becomes possible to perform the verification by efficiently using a small number of pieces of information. Furthermore, according to the first embodiment, the class dividing unit 103 may divide the pieces of the input/output information such that the amount of the pieces of the input/output information contained in each of the classes is the same. Therefore, the amount of the information used for the learning and the amount of the information used for the verification are always kept in the same proportion.

In the first embodiment, a case has been explained that the machine learning apparatus 1 includes the verifying unit 105; however, the machine learning apparatus 1 may not include the verifying unit 105. Specifically, the machine learning apparatus 1 may be an apparatus that performs machine learning. In this case, the machine learning unit 104 may perform the machine learning by using pieces of the input/output information contained in the analysis object set specified by the analysis-object-set specifying unit 102. To perform the machine learning by using the pieces of the input/output information contained in the analysis object set specified by the analysis-object-set specifying unit 102, it may be possible to use, for the machine learning, all of the pieces of the input/output information contained in the analysis object set or to use some of the pieces of the input/output information contained in the analysis object set.

Furthermore, in the first embodiment, a case has been explained that the machine learning unit 104 performs the machine learning by using the pieces of the input/output information contained in the pieces of the analytical information stored in the analytical information storage unit 101; however, the machine learning unit 104 may perform determination on the pieces of the input information received by a receiving unit (not illustrated), by using a result of the machine learning. Incidentally, the machine learning unit 104 may perform the determination by after or before the verifying unit 105 completes the verification.

Moreover, in the first embodiment, a case has been explained that the output unit 106 is provided; however, the machine learning unit 104 may not include the output unit 106. If the output unit 106 is not provided, a changing unit (not illustrated) may change values of various variables according to the verification result of the verification performed by the verifying unit 105. To "change the values of various variables according to the verification result", for example, the verifying unit 105 may repeatedly change the values of various variables until appropriate results are obtained when an improper verification result is obtained. "Until an appropriate result is obtained" may indicate continuation until the verifying unit 105 obtains, as a verification result, a value equal to or greater than a predetermined threshold. For example, the changing unit (not illustrated) may change the values of various variables so that pieces of the input/output information in pieces of the analytical information at time points away from the specific time point are not contained in the analysis object set from the current setting.

In the first embodiment, a case has been explained that the class dividing unit 103 is provided; however, the machine learning apparatus 1 may not include the class dividing unit 103. If the class dividing unit 103 is not provided, it may be possible not to divide the pieces of the information into classes, may perform the machine learning by using some of the pieces of the input/output information in the analysis object set, and may perform the verification by using remaining pieces of the input/output information that are not used for the machine learning. Some of the pieces of the input/output information may be predetermined pieces of the input/output information or randomly-selected pieces of the input/output information. The predetermined pieces of the input/output information may be set by a developer, a user, or the like.

Furthermore, software for implementing the machine learning apparatus 1 according to the first embodiment is a program as described below. Specifically, the program may cause a computer, which can access an analytical information storage unit that stores therein two or more pieces of the analytical information each associating a piece of the input/output information containing information on input and information on output used for machine learning with a piece of the time-point information indicating a time point of the input/output information, to function as an analysis-object-set specifying unit that specifies an analysis object set containing unit-period input-output sets for multiple unit periods that are equally divided in a period, where each of the unit-period input-output set is a set of pieces of the input/output information corresponding to pieces of the time-point information indicating time points in a unit period and an amount of the pieces of the input/output information of the set depends on a period between the time point of the unit period and a specific time point. Furthermore, the program causes the computer to function as a machine learning unit that performs machine learning by using the pieces of the input/output information contained in the analysis object set specified by the analysis-object-set specifying unit.

In the first embodiment, each process (each function) may be implemented through an integrated process performed by a single device (system) or may be implemented through distributed processes performed by multiple devices. Furthermore, two or more communication units provided in a single device in the first embodiment may be implemented by a single physical unit.

Moreover, in the first embodiment, each of the components may be implemented by dedicated hardware. Alternatively, components that are able to be implemented by software may be implemented by executing a program. For example, each of the components may be implemented by causing a program executing unit, such as a central processing unit (CPU), to read and execute software and a program recorded in a recording medium, such as a hard disk or a semiconductor memory.

Incidentally, the functions implemented by the program as described above does not contain a function that is able to be implemented only by hardware. For example, functions that are able to be implemented by only hardware, such as an acquiring unit that acquires information, or a modem or an interface card in an output unit that outputs information, are not included in the functions implemented by the program as described above.

Figure 11:
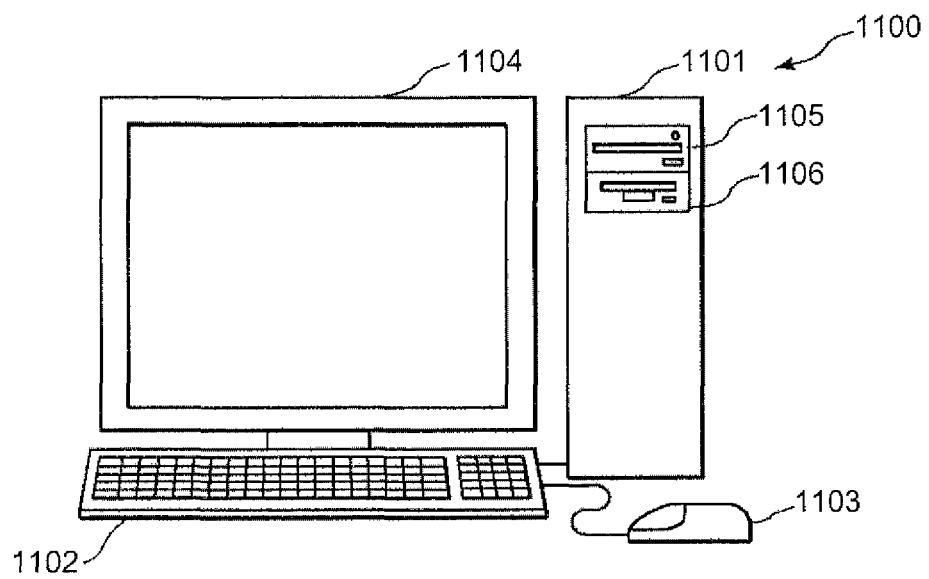
FIG. 11 is a diagram illustrating an example of an exterior of a computer system according to the first embodiment.

FIG. 11 is a schematic diagram illustrating an example of an exterior of a computer that executes the above program to implement the embodiment. The embodiments described above may be realized by computer hardware and a computer program executed by the computer hardware.

In FIG. 11, a computer system 1100 includes a computer 1101 including a compact disc-ROM (CD-ROM) drive 1105 and a flexible disk (FD) drive 1106, and includes a keyboard 1102, a mouse 1103 and a monitor 1104.

Figure 12:
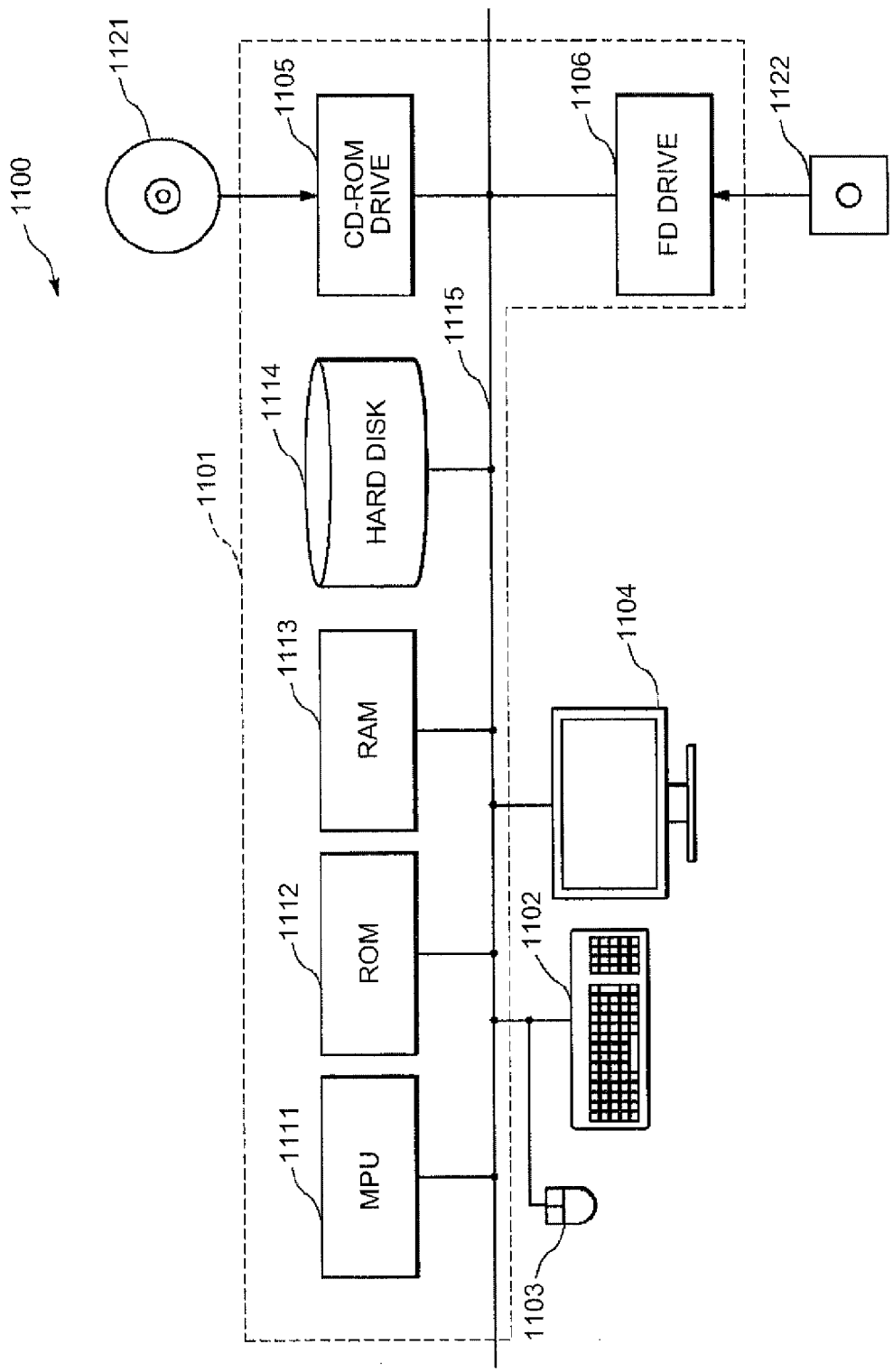
FIG. 12 is a diagram illustrating an example of a configuration of the computer system according to the first embodiment.

FIG. 12 is a diagram illustrating an internal configuration of the computer system 1100. In FIG. 12, the computer 1101 includes an MPG 1111, a ROM 1112 for storing a program, such as a boot-up program, a RAM 1113 that is connected to the MPG 1111, that temporarily stores commands of application programs, and that provides a temporary storage space, a hard disk 1114 for storing an application program, a system program, and data, and a bus 1115 that connects the MPU 1111, the ROM 1112, and the like to one another, in addition to the CD-ROM drive 1105 and the FD drive 1106. The computer 1101 may include a network card (not illustrated) to enable connection to a local area network (LAN).

The program that causes the computer system 1100 to implement the functions according to the embodiment may be stored in a CD-ROM 1121 or an FD 1122, and the CD-ROM 1121 or the FD 1122 may be inserted into the CD-ROM drive 1105 or the FD drive 1106 to transfer the program to the hard disk 1114. Alternatively, the program may be transmitted to the computer 1101 via a network (not illustrated) and stored in the hard disk 1114. The program is loaded on the RAM 1113 when being executed. Alternatively, the program may be loaded directly from the CD-ROM 1121, the FD 1122, or the network.

The program need not always include an operating system (OS) that causes the computer 1101 to implement the functions according to the embodiment, a third party program, or the like. The program may include only a command that calls an appropriate function (module) in a controlled manner to obtain a desired result. The operation of the computer system 1100 is well-known; therefore, detailed explanation thereof will be omitted.

The present invention is not limited to the embodiment as described above. Various modification may be made, and the modifications fall within the scope of the present invention. Furthermore, "a unit" recited in the claims may be replaced with "a means" or "a circuit".

According to the machine learning apparatus of the embodiments, it becomes possible to preferentially learn information at a desired time to be focused on in machine learning, enabling to perform the machine learning with taking into account time points with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A machine learning apparatus comprising:
a memory that stores input/output information containing information on input and information on output used for machine learning and time-point information indicating a time point of the input/output information;
a processor coupled to the memory and programmed to:
specify an analysis object set containing a unit-period input-output set, wherein:
the unit-period input-output set includes the input/output information corresponding to the time-point information that indicates a first time point in one unit period among a plurality of unit periods, and
the plurality of unit periods being obtained by equally dividing a predetermined period, and
an amount of input/output information in the unit-period input-output set which varies based on a period between the first time point and a second time point; and
perform machine learning by using the input/output information contained in the specified analysis object set.

2. The machine learning apparatus according to claim 1, wherein the processor is further programmed to:
verify a result of the machine learning, by using the input/output information other than the input/output information used for the machine learning from among the input/output information contained in the analysis object set,
wherein the processor is programmed to perform the machine learning by using the input/output information contained in the analysis object set.

3. The machine learning apparatus according to claim 2, wherein
the processor is further programmed to:
specify a plurality of the analysis object sets such that the input/output information contained in each of predetermined specific periods becomes the same between the plurality of the analysis object sets, and such that at least the input/output information contained in at least any of the specific periods become different between the plurality of the analysis object sets;
perform the machine learning by using the input/output information other than verification information being the input/output information used for verification among the input/output information contained in each of the analysis object sets; and
verify the result of each machine learning, by using the verification information at the time of the machine learning.

4. The machine learning apparatus according to claim 3, wherein the processor is further programmed to:
specify the plurality of the analysis object sets such that the input/output information is contained at least once in any of the plurality of the analysis object sets.

5. The machine learning apparatus according to claim 3, wherein
the processor is further programmed to:
divide the input/output information contained in each of the plurality of the analysis object sets into multiple classes corresponding to respective class periods divided in a period, wherein
the input/output information contained in each of the classes corresponds to the time-point information indicating time points in each of the class periods of the respective classes; and
repeat machine learning using the input/output information other than the verification information being the input/output information contained in a verification class that is a single class used for the verification, in such a manner that the classes corresponding to class periods that differ for each of the analysis object sets are employed as verification classes and until the classes corresponding to all of the class periods are employed as the verification classes.

6. The machine learning apparatus according to claim 2, wherein the processor is further programmed to:

specify a plurality of the analysis object sets such that the input/output information contained in each of the unit periods becomes the same between the plurality of the analysis object sets, and such that each of the plurality of the analysis object sets contains randomly-selected input/output information;

perform the machine learning by using the input/output information other than verification information being the input/output information used for verification among the input/output information contained in each of the plurality of the analysis object sets; and verify the result of each machine learning, by using the verification information at the time of the machine learning.

7. The machine learning apparatus according to claim 2, wherein processor is further programmed to:

divide the input/output information contained in the analysis object set into multiple classes corresponding to respective class periods divided in a period, wherein the input/output information contained in each of the classes corresponds to pieces of the time-point information indicating the time point in each of the class periods of the respective classes;

repeat machine learning using the input/output information contained in classes other than a verification class that is a single class used for verification in the analysis object set, in such a manner that all of the classes are employed as the verification classes; and verify the result of each machine learning, by using the input/output information contained in the verification class at the time of the machine learning.

8. The machine learning apparatus according to claim 7, wherein the processor is further programmed to divide the input/output information such that an amount of the input/output information contained in each of the classes becomes the same.

9. The machine learning apparatus according to claim 1, wherein the input/output information contained in each of the unit-period input-output sets increases as the period between the time point of the unit period of the unit-period input-output set and the specific time point decreases.

10. The machine learning apparatus according to claim 1, wherein the input/output information contained in each of the unit-period input-output sets periodically changes according to the period between the time point of the unit period of the unit-period input-output set and the specific time point.

11. The machine learning apparatus according to claim 1, wherein the length of the unit period changes depending on a type of the input/output information.

12. A method for machine learning comprising: storing input/output information containing information on input and information on output used for the machine learning and time-point information indicating a time point of the input/output information;

specifying an analysis object set containing a unit-period input-output set, wherein:

the unit-period input-out set includes the input/output information corresponding to the time-point information that indicates a first time point in one unit period among a plurality of unit periods by equally dividing a predetermined period, and an amount of the input/output information in the unit-period input-output set which varies based on a period between the first time point and a second time point; and performing machine learning by using the input/output information contained in the analysis object set.

13. A non-transitory computer-readable recording medium storing a program for a computer that is enabled to access stored input/output information containing information on input and information on output used for machine learning and time-point information indicating a time point of the input/output information, the program causing the computer to execute a process comprising:

causing the computer to:

specify an analysis object set containing a unit-period input-output set, wherein;

the unit-period input-output set includes the input/output information corresponding to the time-point information that indicates a first time point in one unit period among a plurality of unit periods by equally dividing a predetermined period, and an amount of input/output information in the unit-period input-output set which varies based on a period between the first time point and a second time point; and perform machine learning by using the input/output information contained in the specified analysis object set.

* * * * *